April 3, 1934.  R. R. McMATH ET AL  1,953,766
ICE CREAM FREEZER OR THE LIKE
Filed April 5, 1932   2 Sheets-Sheet 1

INVENTOR.
ROBERT R. M<sup>c</sup> MATH AND
OWEN F. NELSON
BY Joseph Farley
ATTORNEY.

April 3, 1934.                R. R. McMATH ET AL                1,953,766
                        ICE CREAM FREEZER OR THE LIKE
                  Filed April 5, 1932            2 Sheets-Sheet 2
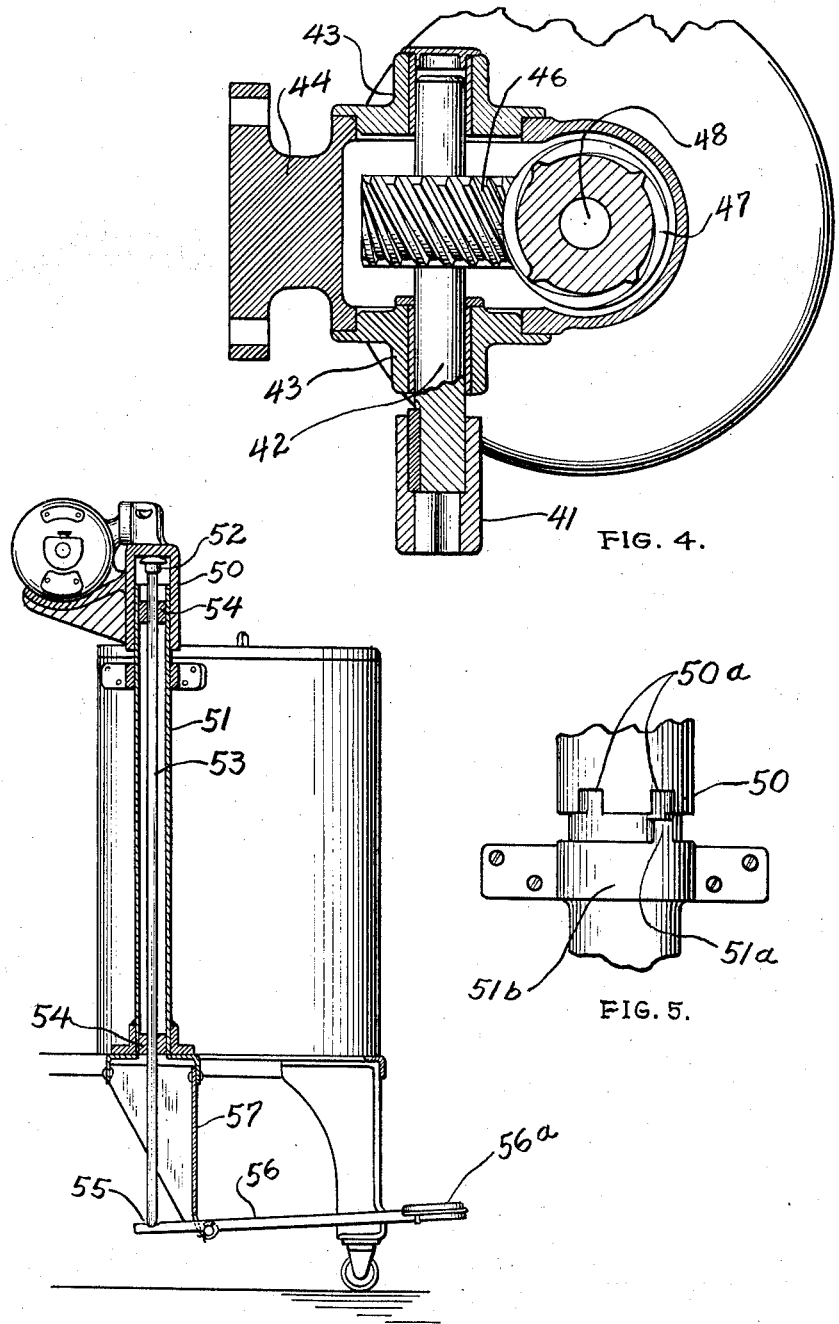
INVENTORS
ROBERT R. McMATH AND
OWEN F. NELSON
BY *Joseph Farley*
ATTORNEY.

Patented Apr. 3, 1934

1,953,766

UNITED STATES PATENT OFFICE 1,953,766

ICE CREAM FREEZER OR THE LIKE

Robert R. McMath and Owen F. Nelson, Detroit, Mich.

Application April 5, 1932, Serial No. 603,294

4 Claims. (Cl. 259—108)

This invention relates to ice cream freezers and has for its principal object to provide a new and improved construction for an ice cream freezer designed primarily for domestic use and of the type wherein electric refrigeration is used for the freezing medium.

Another object of the invention is to provide a freezer of the type described, in which the dasher or agitator is driven by an electric motor, and gearing of simple, sturdy and compact construction.

A further object is to provide means for disconnecting the driving mechanism from the agitator of simple construction and capable of being operated with a minimum of physical effort by persons having but little or no mechanical skill.

Another object is to provide a device of the character described in which the freezer and refrigerating units are compactly grouped upon a single supporting base which is preferably provided with casters, rollers or the like, to render the device readily portable.

A further object is to include means for stopping the operation of the agitator driving mechanism automatically when the ice cream is frozen to the proper consistency.

Another object is to provide a new and improved mounting for the electric motor and driving mechanism of the agitator, by means of which the driving mechanism may be readily disconnected from the agitator and swung to an inoperative position to one side of the freezer so as to permit ready access to the contents thereof.

A further object is to so combine the freezing coil of the electrically operated refrigerating system with the can or container of the freezer as to secure the most efficient heat exchange relationship between the coil and container.

The above and further objects, such as the providing of a device of neat and attractive appearance, and which will be as nearly as possible entirely automatic in its operation, so as to require but a minimum of effort and attention, will appear more fully from the following more detailed description and by reference to the accompanying drawings, wherein is shown by way of illustration a satisfactory constructional example of the invention and wherein;

Fig. 3 is a view, partly in elevation and partly in section on the line 3—3 of Fig. 1;

Fig. 4 is an enlarged vertical section through the driving mechanism taken on the line 4—4 of Fig. 1;

Fig. 5 is a view, partly in elevation, of the device used to lock the dasher in or out of position.

Figure 1:
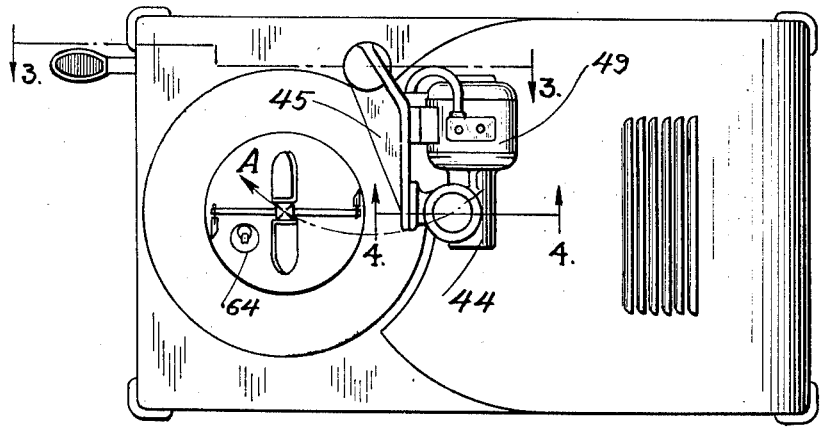
Fig. 1 is a plan view of such an embodiment of the invention.
Figure 2:
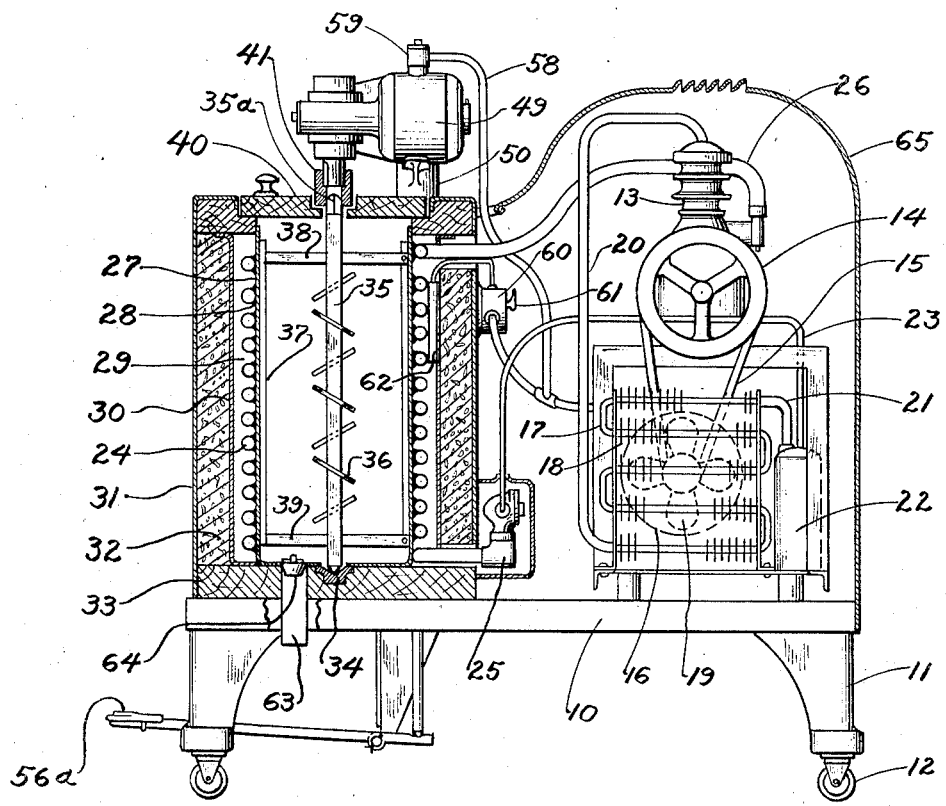
Fig. 2 is a central vertical section.

As shown in the drawings the numeral 10 indicates a supporting base provided with a plurality of depending legs 11, which at their lower ends preferably have secured thereto casters 12 or the like, to permit the apparatus to be readily wheeled to the place of use and to be placed in an out of the way place when not in use.

The apparatus consists of a container and a dasher, comprising the freezer per se, an electrical refrigerating system, and driving mechanism for actuating the dasher.

The electric refrigerating unit may be of any suitable or well-known construction and comprises a pump or compressor 13 provided with a pulley or sheave wheel 14 driven by the belt 15 from an electric motor 16. The refrigerating unit includes the usual condenser coil 17 provided with radiating fins 18 and over which a cooling current of air is driven by means of a fan 19 suitably secured to the armature shaft of the electric motor 16. The condenser coil is connected by means of a conduit 20 with the freezer side of the pump 13 and also connected by the conduit 21 with a collecting chamber 22. The chamber 22 is in turn connected by a conduit 23 to one end of the refrigerating coil 24, an expansion valve 25 being interposed between chamber 22 and the coil 24. At its other end the coil 24 is connected by means of a conduit 26 with the suction side of the compressor 13.

The coil 24 is of spiral configuration and encircles a can or container 27 in which the freezing operation is carried out. In order to insure the highest possible efficiency of heat exchange the coil 24 is integrally united with the outer side wall of the container 27 by soldering or welding the coil to the container as indicated by the numeral 28, the heating or soldering operation preferably being so performed as to cause the metal on the weld or solder to cover approximately one-half of the circular cross-section of the pipe that forms the refrigerating coil. The use of a weld or solder in connecting the refrigerating coil to the container in place of the other commonly used expedients, obviates the objectionable rapid deterioration of the metal of the coil and container which occurs when brine solutions are used, and in addition results in obtaining a more efficient heat exchange relationship than is secured with brine solutions or with any of the commonly used plastic material.

It will be noted that the coil 24 is contained within an air space 29 defined between the outer side wall of the container 27 and an annular or hollow cylindrical shell 30 concentrically spaced from the container 27. An outer casting 31 is in turn concentrically spaced from the shell 30 and the space between these two members is filled or packed with any suitable insulating material 32, such as cork or the like.

The freezing unit consisting of the container 27 and associated parts as above just described, is fixedly mounted upon a block 33 of wood or other suitable material secured to the base 10. Suitably seated within and secured to the block 33 is a thrust bearing 34 in which is rotatably mounted the lower rounded end of the agitator or dasher 35, which in accordance with the usual construction of devices of this character has suitably secured to it a plurality of agitating arms 36 which project radially from the dasher shaft 35. A pair of diametrically opposed scraper plates 37 are secured to the dasher shaft by upper and lower connecting bars 38 and 39.

At its upper end, the dasher shaft 35 is provided with a square or other non-circular portion 35a which projects through an aperture in a removable lid or cover 40 which closes the upper end of the container 27. The square upper end of the dasher shaft is adapted to be received into a correspondingly shaped recess in a connecting sleeve 41. The sleeve 41 is keyed or non-rotatably secured in any suitable way to the lower end of a jack shaft 42 suitably journaled in spaced bearing caps 43 seated in a gear housing 44, which is secured to a bracket 45 presently to be more fully described. Secured upon the jack shaft 42 within the housing 44 is a worm gear 46 which meshes with and is driven by a worm 47. The worm 47 is secured to the armature shaft 48 of an electric motor 49, the motor 49 also being secured to and carried by the bracket 45 above referred to.

The bracket 45 is provided at one end with a hollow bearing boss 50 which is slidably and rotatably engaged upon the upper end of a hollow supporting standard 51, the lower end of which is suitably secured to the base 10. The lower end of the boss 50 is provided with a pair of sockets 50a which are adapted to engage a lug 51a provided in the upper face of a bracing sleeve 51b secured to the outer wall 31 of the container. The bracing sleeve serves to hold the supporting standard securely in position and the lug 51a and sockets 50a provide locking means for holding the bracket with the power means for driving the dasher in operative or inoperative position.

As will be seen from Fig. 3 the boss 50 is closed at its upper end and is adapted to be engaged by the enlarged head 52 of a push rod 53. This rod 53 extends through the hollow standard 51 and is guided for sliding movement therein in a pair of bearing blocks 54. The rod projects downwardly beyond the lowermost end of the tube and below the base 10 and its lower end rests in a recess or depression 55 formed adjacent to the inner end of a foot pedal 56. The pedal 56 is pivotally mounted in the lower end of a supporting bracket 57 secured to the under face of the base 10 and said pedal projects outwardly beyond the base and is provided at its outer end with a foot treadle portion 56a.

Current is supplied to the electric motor through suitable lead wires within the conduit 58 and under the control of a switch 59. The electric circuit leading to the motor 49 includes an overload switch, not shown, of any usual and well-known construction, and which is adapted to automatically cut off the supply of current to the motor when the load thereon exceeds a pre-determined limit, this overload limit on the motor being such as would be reached when the material in the freezer has been frozen to the proper consistency.

The current for operating the refrigerating unit is under control of a switch 60 provided with a manually operated key 61 for enabling the refrigerating unit to be placed in operative condition. The switch 60, however, includes an automatic thermostatic control, indicated by reference character 62.

For convenience in cleaning the container 27 the lower end thereof is provided with an aperture in which is received a small drain spout 63, the lower end of which projects below the bottom of the base 10. A plug or stopper 64 is adapted to be received in and close the upper end of the spout 63.

The manner in which the device operates is as follows:

When it is desired to freeze a quantity of ice cream the key 61 of the switch 60 is turned to the "On" position, it being understood that the device is furnished with an extension cord for enabling the electrical units to be connected with a wall outlet or electric light socket, the electric current from the line will be delivered to the motor 16 of the refrigerating system causing the pump or compressor 13 to be placed in operation and the refrigerating medium to be circulated through said system in the well-known manner. The operator's foot will be placed upon the foot treadle 56a to depress the same, thus causing the pedal 56 to be rotated on its pivot and causing the inner end thereof to be elevated. The elevation of the inner end of the pedal 56 will be communicated to the rod 53 and the upper enlarged end of the rod, pushing upwardly upon the inner end of the hollow boss 50, will cause the bracket 45 to be raised carrying with it the motor 49, gear housing 44 and jack shaft 42. The socket 41 carried by the lower end of the jack shaft will thus be lifted out of engagement with the square upper end 35a of the dasher shaft 35 and will also disengage the locking means 50a, 57a. This will permit the bracket 45 and the parts carried thereby to be swung rearwardly to the full line position of these parts shown in Fig. 1. With the parts in this position free access to the container 27 may be had, as will be seen from an inspection of Fig. 1. The material to be frozen is then placed within the can 27, and the cover 40 is then placed on top of said can. The pedal 56 is again operated to raise the bracket 45 and the parts carried thereby and the bracket is then swung forwardly in the direction of the arrow A in Fig. 1 until the sleeve 41 is in vertical alignment with the dasher shaft. Pressure on the foot pedal 56 is then released and the bracket 45 is lowered until the recess in the lower end of the sleeve 41 is engaged over the squared upper end 35a of the dasher shaft. The current of the electric motor 49 is established by the operation of the switch 59 and the electric motor 49, being placed in rotation, its rotation will be communicated to the dasher shaft 35 through the gear 46, jack shaft 42 and sleeve 41. The dasher shaft rotating will cause the contents of the freezer to be agitated in the usual manner. During the freezing operation the efficient heat exchange relationship between the cooling or expansion coil 24 on the walls of the container 27 will cause the temperature of the contents of the container to be rapidly lowered. When the contents have reached the proper consistency the overload switch included in the circuit to the motor 49 will cause the current to the motor to be interrupted. After the contents have been frozen the switch for the refrigerating system is left in the "On" position and due to the thermostatic control 62 provided in the circuit to the refrigerating system the contents will be kept at below freezing temperature for as long a period of time as may be desired, the thermostatic control functioning to put the compressor 13 in operation as necessary.

As will be seen from the above the freezer will require no attention after it has been initially put in operation as above described, the motor 49 stopping whenever the contents are properly frozen. The automatic operation of the refrigerating system under thermostatic control enables the frozen contents of the freezer to be kept in perfect condition for several days without any further attention.

The refrigerating system is preferably covered by and enclosed within a sheet metal housing 65 of neat and attractive appearance. As will be readily understood the housing 65 as well as the outer casing 29 for the freezer may be fashioned to any desired attractive shape or contour and colored or decorated. The mounting of the device on casters or other roller supports enables it to be moved readily to and from a place of use and to be stored in an out-of-the-way place when not in use.

While we have shown by way of illustration a constructional example that has proved highly satisfactory in practice, it will be understood that the invention is not limited to the particular constructional example shown and described, but that many changes, variations and modifications may be resorted to without departing from the principles of the invention.

We claim:

1. In an ice cream freezer a wheeled supporting base, a container carried by said base, a dasher mounted for rotation within said container, a supporting standard carried by said base, a bracket mounted on the upper end of said standard for vertical and rotatable movement, an electric motor carried by said bracket, gearing driven by said motor, a detachable connection between said gearing and said dasher, means to lock said bracket in operative and inoperative positions and a single lever for raising said bracket out of engagement with said locking means, and simultaneously disengaging the detachable connection between said gearing and dasher.

2. In an ice cream freezer a wheeled supporting base, a container carried by said base, a dasher mounted for rotation within said container, a supporting standard carried by said base, a bracket rotatably mounted on the upper end of said standard, an electric motor carried by said bracket, gearing driven by said motor, a detachable connection between said gearing and said dasher, means to lock said bracket in operative and inoperative position and a foot operated pedal for raising said bracket out of engagement with said locking means, and simultaneously disengaging the detachable connection between said gearing and dasher.

3. In an ice cream freezer a container, a dasher rotatably mounted in said container, power operated means for driving said dasher including a motor, a reduction gearing and a detachable connection between said gearing and dasher, a bracket upon which said motor is mounted for movement to and from operative driving relationship with said dasher, a hollow supporting standard upon which said bracket is rotatably mounted, means for locking said bracket in operative and inoperative positions, a foot operated treadle located below said hollow standard and a push rod connecting said treadle and said bracket.

4. An ice cream freezer as claimed in claim 3 in which said bracket is provided with a hollow boss embracing the upper part of said hollow standard, the upper end of said boss being closed and said push rod is provided with an enlarged rounded head for engagement with the closed inner end of said boss.

ROBERT R. McMATH.
OWEN F. NELSON.